No. 743,520. PATENTED NOV. 10, 1903.
J. H. KENNEDY.
BALE TYING ATTACHMENT FOR COMPRESSORS.
APPLICATION FILED JUNE 9, 1900.
NO MODEL. 8 SHEETS—SHEET 1.

WITNESSES
INVENTOR
John H. Kennedy.
By his Atty.
Geo. D. Phillips

No. 743,520. PATENTED NOV. 10, 1903.
J. H. KENNEDY.
BALE TYING ATTACHMENT FOR COMPRESSORS.
APPLICATION FILED JUNE 9, 1900.
NO MODEL. 8 SHEETS—SHEET 3.

WITNESSES

INVENTOR
John H. Kennedy.
By his Atty.
Geo. O. Phillips

No. 743,520. PATENTED NOV. 10, 1903.
J. H. KENNEDY.
BALE TYING ATTACHMENT FOR COMPRESSORS.
APPLICATION FILED JUNE 9, 1900.
NO MODEL. 8 SHEETS—SHEET 5.

WITNESSES

INVENTOR
John H. Kennedy.
By his Atty.
Geo. D. Phillips.

No. 743,520. PATENTED NOV. 10, 1903.
J. H. KENNEDY.
BALE TYING ATTACHMENT FOR COMPRESSORS.
APPLICATION FILED JUNE 9, 1900.
NO MODEL. 8 SHEETS—SHEET 6.

No. 743,520. PATENTED NOV. 10, 1903.
J. H. KENNEDY.
BALE TYING ATTACHMENT FOR COMPRESSORS.
APPLICATION FILED JUNE 9, 1900.
NO MODEL. 8 SHEETS—SHEET 8.

Fig. 22.

WITNESSES.
H. A. Lamb.
L. R. Hoyt

INVENTOR.
John H. Kennedy.
By his Atty.
Geo. D. Phillips

No. 743,520. Patented November 10, 1903.

UNITED STATES PATENT OFFICE.

JOHN H. KENNEDY, OF SAVANNAH, GEORGIA, ASSIGNOR TO AARON F. CHURCHILL, OF SAVANNAH, GEORGIA.

BALE-TYING ATTACHMENT FOR COMPRESSORS.

SPECIFICATION forming part of Letters Patent No. 743,520, dated November 10, 1903.

Application filed June 9, 1900. Serial No. 19,712. (No model.)

*To all whom it may concern:*

Be it known that I, JOHN H. KENNEDY, a citizen of the United States, and a resident of Savannah, in the county of Chatham and State of Georgia, have invented certain new and useful Improvements in Bale-Tying Attachments for Compressors, of which the following is a specification.

My invention relates to an improved bale-tying machine to be used in conjunction with a cotton or other like compressor, the detail construction of which will be more fully set forth in the following specification.

To enable others to understand my invention, reference is had to the accompanying drawings, in which—

Figures 1, 18, 19:
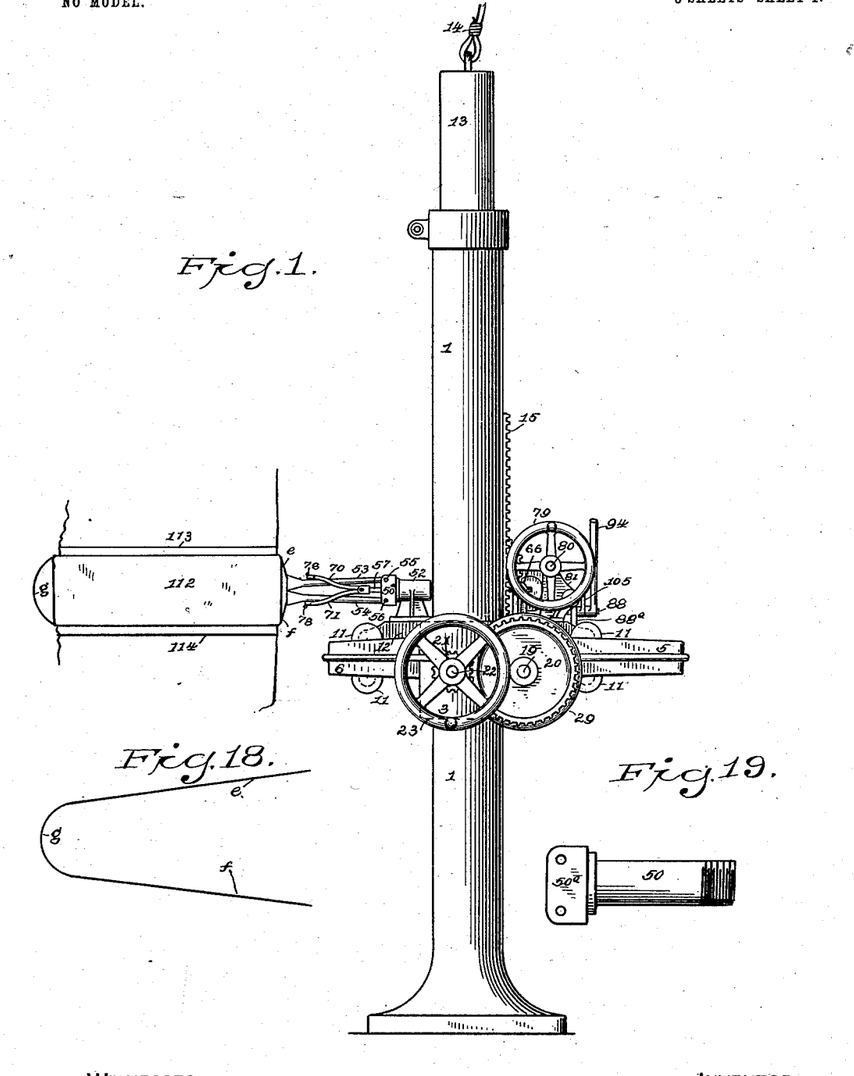
Figure 1 represents a side elevation of the machine and a section of a cotton-press with a bale of cotton compressed between the platens of the same, showing the twisters closed and engaged with the wire bale-ties.
Fig. 18 is a detail view of a U-shape wire bale-tie.
Fig. 19 is a detail view of one of the rotatable spindles to which the twister-arms are pivotally connected.
Figure 2:
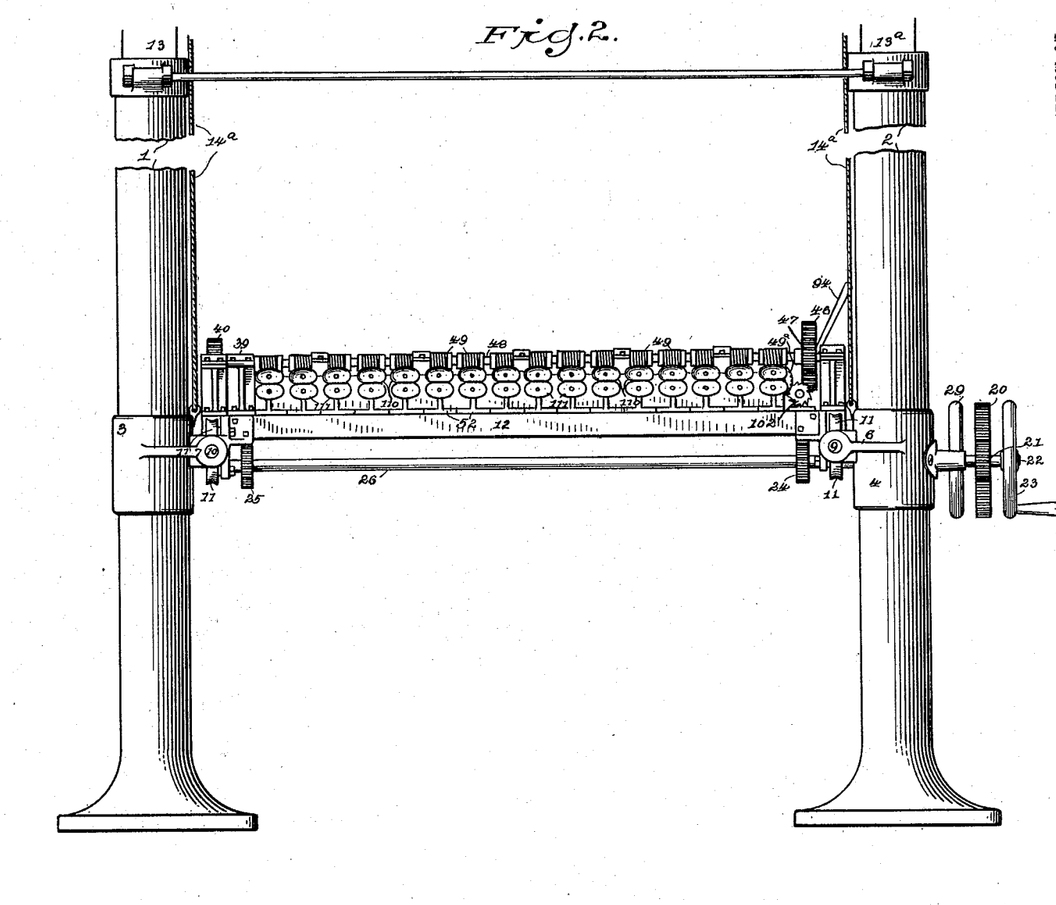
Fig. 2 is a front elevation of the machine adapted to face the compressor and broken view of its supporting-columns.

Its construction and operation are as follows:

1 and 2 are the two supporting-columns, adapted to rest on the floor in front of a cotton-compressor and support the vertically-operating carriage presently to be described. 3 and 4 are sleeves loosely embracing these columns. 5, 6, 7, and 8, Figs. 1, 2, 3, and 4, are arms integral with and projecting laterally from these sleeves. 9 and 10 are rods rigidly mounted in said arms to serve as tracks for the eight grooved carriage-rollers or trolley-wheels 11, connected with the reciprocating carriage 12. As these rollers are all alike and perform the same function, they will of course be designated by the same figure of reference. The whole weight, therefore, of the carriage and the mechanism thereon rests on these rods carried by said sleeves 3 and 4, loosely embracing the uprights or columns 1 and 2. To counterbalance this, the said columns are made hollow and adapted to receive the long weights 13 and $13^a$. 14 and $14^a$ are wire ropes attached to the upper end of these weights, which ropes pass over pulleys in the ceiling (not shown) and from thence extend downward and connect with the sleeves 3 and 4, as shown at Fig. 2. In this way the carriage is nicely balanced, so that it can be raised or lowered readily by hand.

15 and 16 are racks secured to the columns. 17 and 18 are pinions engaging said rack as means for vertically operating the carriage. These pinions are secured to the shaft 19, Figs. 1, 3, 4, 12, and 13. 20 is a large gear on the outer end of said shaft, which is engaged by the pinion 21 on the stud 22, which stud is journaled in a boss of the sleeve 3. 23 is a hand-wheel for communicating motion to said gear 20 and the shaft 19 to raise and lower the carriage.

Figure 3:
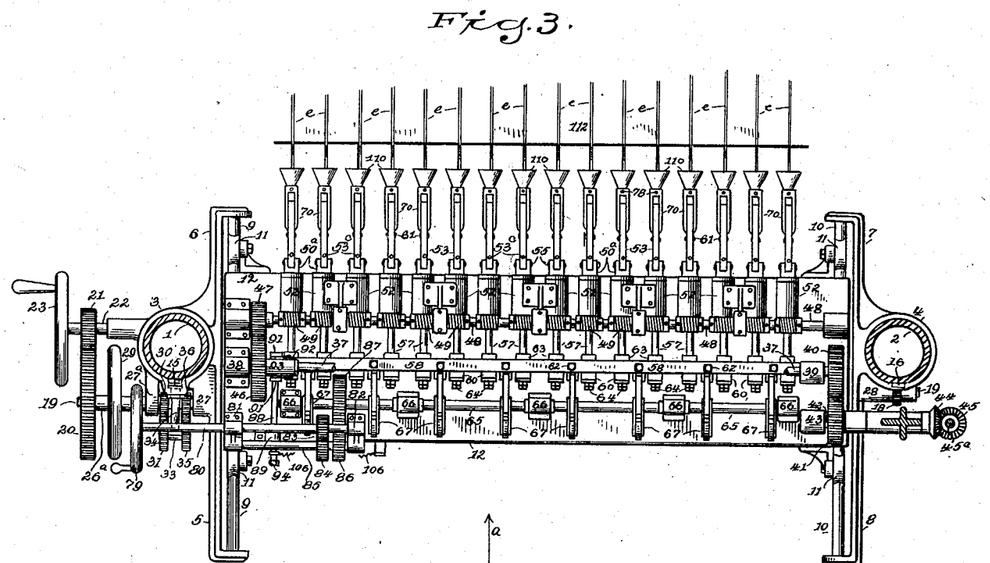
Fig. 3 is an upper plan view of the machine with the twisters engaged with the wire bale-ties about a cotton-bale.
Figure 12:
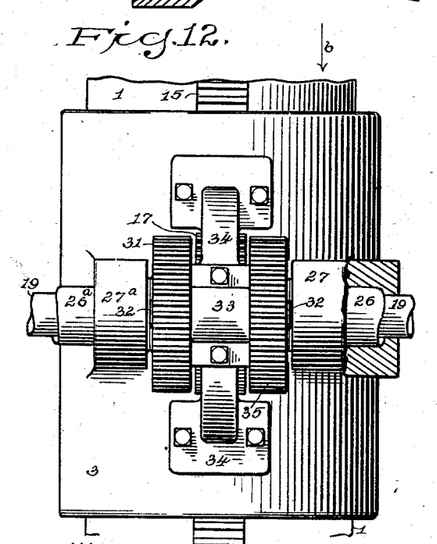
Fig. 12 is a broken view of one of the supporting-columns and sleeve adapted to slide thereon, broken view of the shaft operating such sleeve and the carriage.
Figure 13:
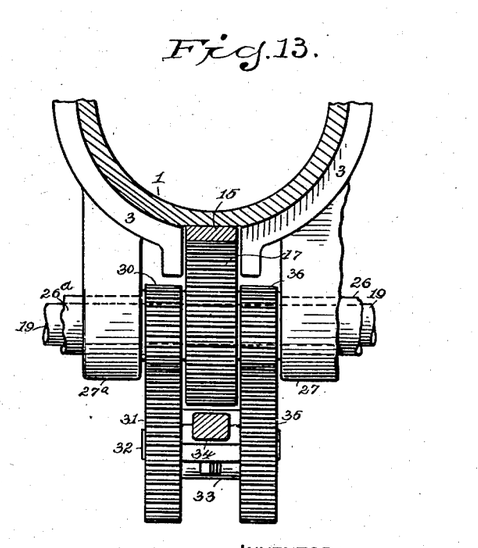
Fig. 13 is a broken view, partly in section, of the view shown at Fig. 12 looking in the direction of arrow *b*.

To reciprocate the carriage 12 back and forth on the before-mentioned tracks 9 and 10, racks (not shown) are attached to the under side of said carriage, which racks are engaged by the pinions 24 and 25. These pinions are secured to the long sleeve 26, loosely embracing the shaft 19, that actuates the pinions for vertically operating the carriage, as before mentioned. One end of this sleeve is journaled in the ear 27, Fig. 12, projecting from the large column-sleeve 3, while the other end is journaled in the bearing 28 on the column-sleeve 4. (Shown at Fig. 4.) $26^a$ is a similar sleeve, but shorter, that embraces the projecting end of the internal shaft 19, as shown at Figs. 3, 12, and 13, to which sleeve is fastened the hand-wheel 29. This sleeve passes through the ear $27^a$ of the column-sleeve 3 and carries on its inner end, Fig. 13, the pinion 30, which in turn meshes with the pinion 31, mounted on the short shaft 32, journaled in the box 33 of the bracket 34, bolted to the exterior of the column-sleeve 3. Referring again to Fig. 13, 35 is a pinion of the same diameter as pinion 31 and mounted on the opposite end of the shaft 32 This pinion meshes with the pinion 36, mounted on the end of the long sleeve 26. In the manner just described the carriage is vertically and horizontally operated by the simple arrangement of this shaft and sleeve, which would otherwise require more or less complicated mechanism to effect.

All the mechanism for twisting the wire bale-ties are mounted upon the carriage 12.

Figure 4:
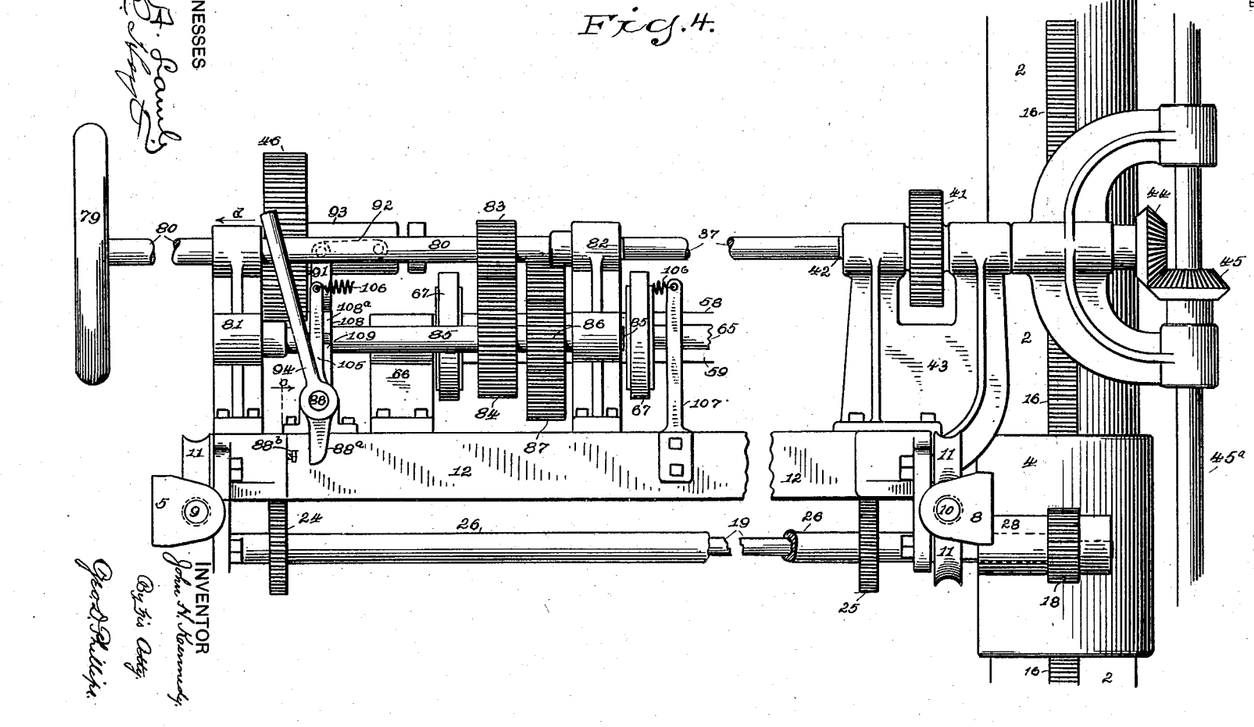
Fig. 4 is an enlarged broken view of the machine looking in the direction of arrow *a* of Fig. 3.
Figure 14:
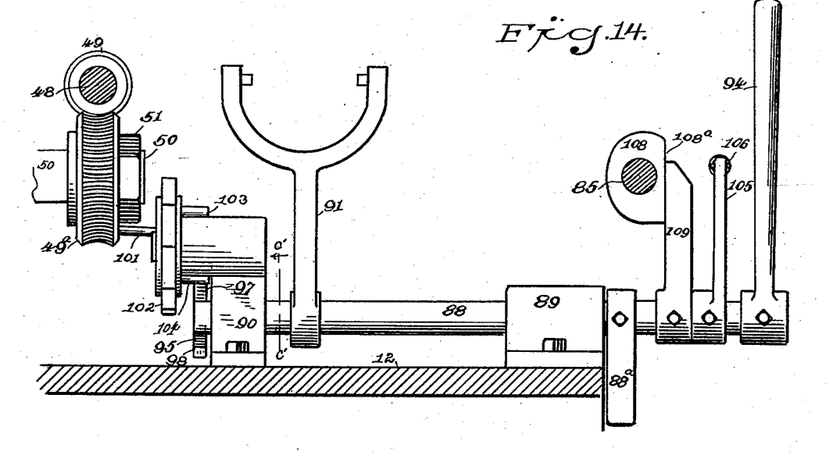
Fig. 14 is a broken sectional view of the carriage through line *c* of Fig. 4, clutch trip-shaft mounted thereon, clutch-lever, trip mechanism, one of the worm and spiral gears, broken and sectional view of their supporting-shafts.

37, Fig. 4, is the main driving-shaft, journaled in the end bearings 38 and 39, as shown also at Fig. 3. In this latter view this shaft 37 is broken to give a better view of the mechanism under such shaft. 40 is a gear on said shaft, that registers with the gear 41 on the jack-shaft 42, mounted in the double standard 43. (Shown at Fig. 4.) On the outer end of this jack-shaft is the bevel-gear 44, meshing with the bevel-gear 45 of the vertical engine-shaft $45^a$, whereby motion is communicated from the engine (not shown) to the before-mentioned main driving-shaft. 46 is another gear on the opposite end of said driving-shaft, that registers with the gear 47, mounted on the worm-shaft 48, which worm-shaft carries a series of worm-gears 49, as shown at Figs. 2, 3, and 14. These worm-gears register with a series of spiral gears $49^a$, mounted on a series of short hollow spindles 50, one of which is shown at Fig. 19, having the T-shaped heads $50^a$. (See also Figs. 5 and 6.) The ends of each of these hollow spindles are threaded to receive the nuts 51, and said spindles are journaled in the short standards 52, mounted on the carriage 12.

53 and 54 are the twister-arms, pivotally supported on the pins 55 and 56 of the heads $50^a$.

Figures 15, 16, 17:
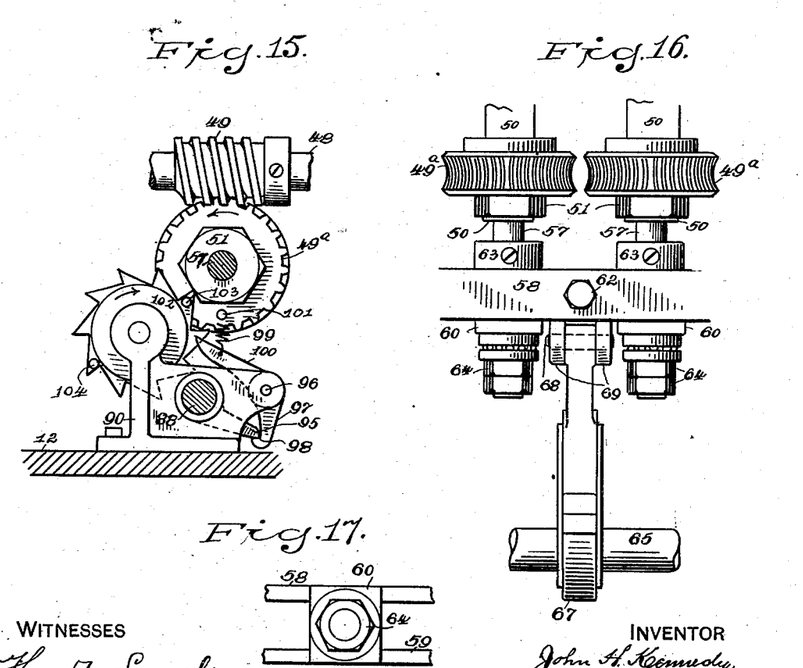
Fig. 15 is an end elevation of the trip mechanism, sectional view of clutch trip-shaft through line *c'* of Fig. 14, broken sectional view of the worm-shaft with one of the worms thereon, elevation of one of the spiral gears, and sectional view of its shaft.
Fig. 16 is an upper plan view of two of the spiral gears connected with the twisting mechanism, broken view of the twister-spindles, eccentric-shaft, and horizontally-reciprocating head to which the twister-spindles and eccentrics are attached.
Fig. 17 is a broken detail side elevation of the movable head.
Figure 20:
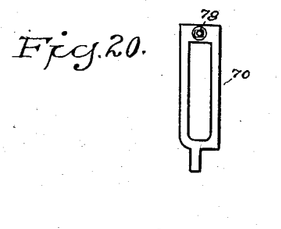
Fig. 20 is a detail view of one of the twister-arm-connecting links.

57 represents a series of horizontally-operating rods passing freely through the several hollow spindles 50 and are anchored in the reciprocating head composed of the two parallel bars 58 and 59, Figs. 3, 5, 6, 16, and 17. 60 represents a series of T-shaped blocks placed between these parallel bars and securely held therein by means of a series of bolts 62, Fig. 16. The before-mentioned rods 57 pass freely through said blocks and are held therein by means of the collars 63 and the jam-nuts 64.

65 is an eccentric-shaft journaled (see also Fig. 3) in the standards 66. 67 represents a series of eccentrics mounted on said shaft, (see also Figs. 5 and 6,) which eccentrics are also pivotally connected to said reciprocating head by means of the pins 68, projecting through the ears 69.

Figures 9, 10, 11:
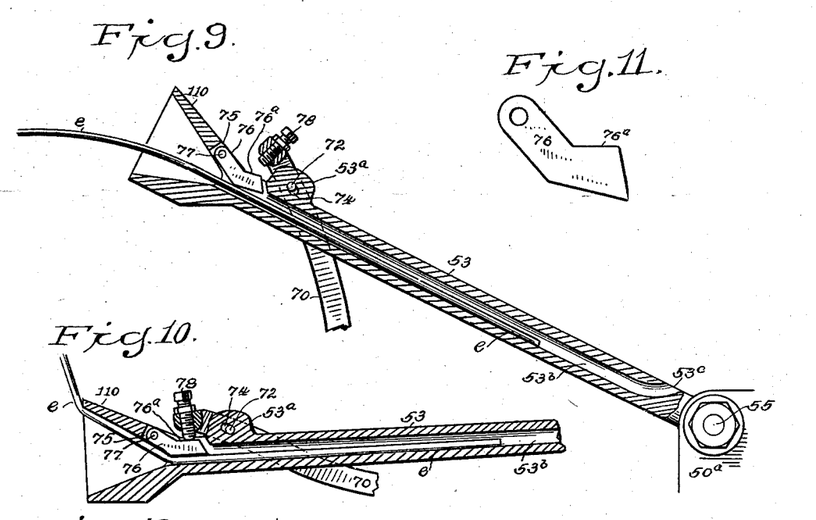
Fig. 9 is a detail longitudinal sectional view of one of the upper twister-arms in open position to receive one leg of a wire bale-tie, also broken view of one of the links for opening the twister-arms.
Fig. 10 is a detail broken longitudinal sectional view of the same arm closed and brought to the center of a cotton-bale preparatory to pulling up the slack and twisting.
Fig. 11 is a full-size detail view of one of the clamping-dogs pivotally hung on each twister-arm and adapted to be engaged with the wire bale-tie.

70 and 71 are two links adapted to straddle the twister-arms and are pivotally supported by one end to the pin 61 on the end of rod 57. 72 represents pins rigidly secured in said links and near their outer ends, which pins are adapted to enter the elongated holes 74 in the ears $53^a$ and $54^a$ of the twister-arms, as shown at Figs. 9 and 10. This arrangement of the said links and their connection with the twister-arms and the horizontally-operating rod 57 will operate to open and close said arms by the movement of said rod.

Referring to Fig. 9, each of the twister-arms has the hole or bore $53^b$ running nearly their entire length and meeting the surface hole $53^c$ near the pivotal support of the said arms. The object of this is to provide means for the escape or projection of the ends of an unusually long bale-tie. 75 is a slot opening into this hole or bore, adapted to receive the dogs 76, pivotally supported on the pin 77.

78 is an adjusting-screw in each end of the operating-links, whose projecting end is adapted to engage with the surface 76ª (seen also at Fig. 11) to exert a pressure or grip on the wires.

The form of bale-tie used is shown at Fig. 18, being a U-shaped wire construction adapted to straddle a cotton-bale when fully compressed and while under pressure. Means (not shown and forming no part of my present invention) are provided on the platens of the press for the introduction of the legs e and f of the tie. When the bale is fully compressed, these U-shape bale-ties are inserted from the opposite side of the press from that where the twisting mechanism is located, the free ends projecting toward the said machine and are engaged by the twister mechanism in a manner and for the purpose presently to be more fully described.

The twister-arms are opened and closed by the rotation of the eccentric-shaft 65 and the intervening mechanism directly connected therewith, as before mentioned. Motion is communicated to said eccentric-shaft by turning the hand-wheel 79, Figs. 1, 3, and 4, mounted on the short shaft 80, which shaft is journaled in the standards 81 and 82, mounted on the carriage 12. 83 is a pinion mounted on this shaft, which registers with the pinion 84, mounted on another short shaft 85, also journaled in said standards, and 86 is still another pinion mounted on this shaft 85, which registers with the gear 87, mounted on the eccentric-shaft 65. Therefore turning this hand-wheel will rotate the eccentrics 67 and by their connection with the reciprocating head, before described, will operate the twister-arms.

In baling the driving-shaft 37 runs continually, while the twister mechanism will remain stationary part of the time. The worm-shaft 48 and the rotary twister devices, which of course includes the twister-arms 53 and 54, are set in motion and stopped through the medium of mechanism shown at Figs. 14 and 15 in connection with Figs. 1, 3, and 4.

88 is a shaft journaled in the standards 89 and 90. 91 is a fork-lever mounted on this shaft, whose forked ends are pivotally connected with links 92, which links are pivotally connected with the sliding sleeve 93 on the main driving-shaft 37. The inner end of this sleeve carries clutch mechanism (not shown) adapted to operate within the gear 46, mounted on said driving-shaft, whereby said gear is set in motion or stopped, as required.

94 is a handle-lever mounted on the outer end of shaft 88, whereby such shaft is partially rotated to engage or disengage the clutch mechanism previously mentioned. On the inner end of shaft 88, Fig. 15, is the toe 95, rigidly attached to said shaft.

96 is a pin in the standard 90, on which pin is pivotally supported a bell-crank lever whose lower arm 97 is provided with the notch 98, adapted to receive and hold the toe 95 in suspension. When, therefore, the handle-lever 94 is turned to the left, or in the direction of arrow d, Fig. 4, the shaft 88 will be partially rotated, so as to bring the clutch mechanism before mentioned into operation and start the worm-shaft. Throwing over this lever to accomplish this will lock the toe 95 into the notch 98 of the lower arm 97 of the bell-crank lever. 99 is a spring attached to the other arm 100 of said lever, whereby the engagement of said toe is maintained until automatically disengaged. The other end of said spring is attached to any suitable stationary part of the machine.

The tripping of shaft 88 so as to disengage the clutch mechanism is accomplished as follows: The spiral gear next to the standard 90 is provided, Figs. 14 and 15, with the pin 101, adapted to engage with the teeth of the frictionally-maintained star-wheel 102, mounted on a stud in the upper end of the standard 90. On this star-wheel are the two pins 103 and 104, adapted to engage the upper arm 100 of the bell-crank lever. When, therefore, the proper twist is effected, to be hereinafter more fully described, the star-wheel will have been rotated until one of its pins has depressed the arm 100 of the said bell-crank lever and released the toe 95. 105 is an arm on shaft 88, having attached to its upper end the retractile spring 106, Fig. 4, whose opposite end is connected to the arm 107, which arm is attached to the carriage. This spring will rotate shaft 88 in the opposite direction as soon as said toe is disengaged, and thus disengage the clutch mechanism and stop the twisting mechanism. 88ª, Figs. 4 and 14, is an arm depending from shaft 88, which arm, in connection with the adjustable stop-screw 88ᵇ, will limit the travel of said shaft when under the influence of the spring 106. The object of the two pins 103 and 104 in the said star-wheel is to effect the tripping of the shaft 88 at every half-turn of said wheel. As each tooth in said wheel represents one twist of the wires, it is evident that the number of teeth and tripping-pins may be varied to suit the number of twists required.

Figure 5:
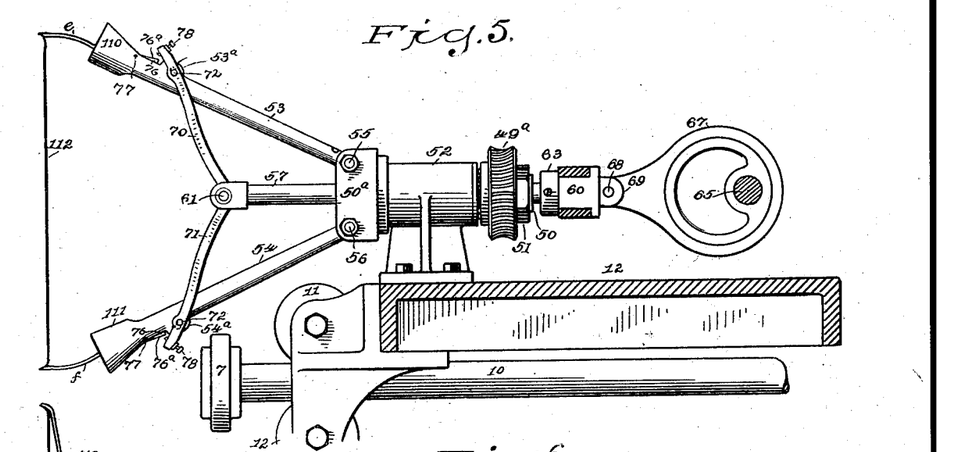
Fig. 5 is an enlarged broken view, partly in section, of the carriage for supporting the wire-twisting mechanism, twister-arms fully opened with a wire bale-tie inserted therein, and broken view of a compressed bale of cotton.
Figures 6, 7, 8:
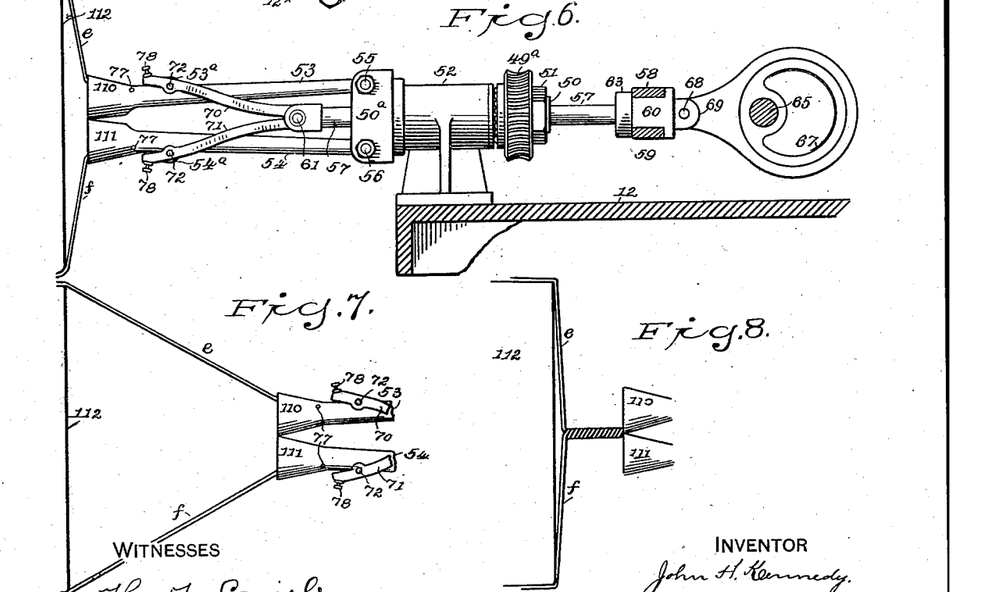
Fig. 6 is an enlarged broken view, partly in section, of the carriage, the twister-arms shown as closed, also broken view of a cotton-bale.
Fig. 7 is a broken view of the twister-arms closed and moved back, so as to take up all the slack of the wire tie, also broken view of a compressed cotton-bale.
Fig. 8 is a broken view of a cotton-bale with the wire tie fully twisted or tied about the same and broken view of the twister-arms in readiness to be disengaged from the wire.
Figure 21:
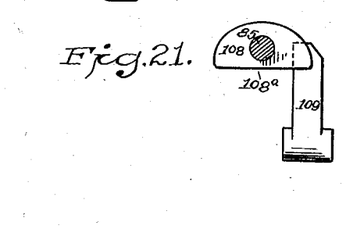
Fig. 21 is a detail view of mechanism to prevent the twister-arms being rotated while in open position.
Figure 22:
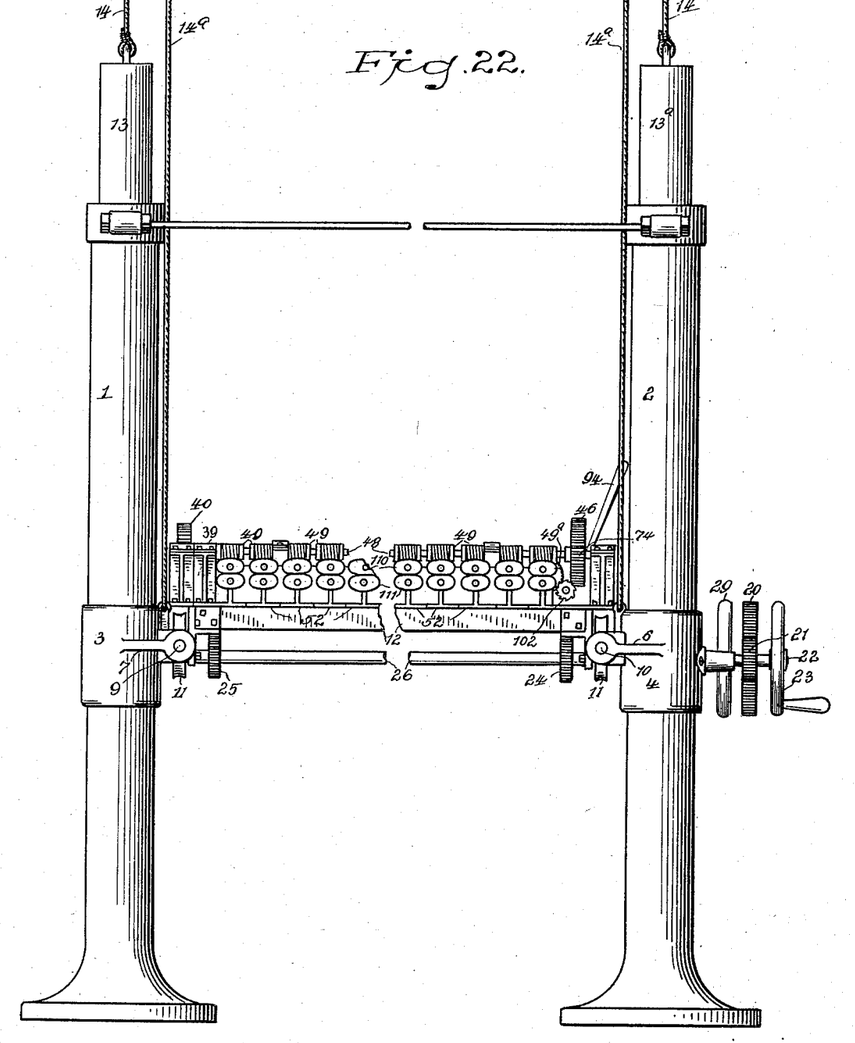
Fig. 22 is a front elevation of the machine, showing the supporting-columns in full view, broken view of the twisting mechanism supported thereon.

To prevent the clutch mechanism being thrown in while the twister-arms are in the open position shown at Fig. 5, and thereby break the machine, owing to the fact, as will be hereinafter more fully described, that these arms, being close together, can only rotate while closed, as shown at Fig. 6, and in order to close these arms the eccentrics must be thrown back in the position as shown, as before stated the eccentric-shaft 65 is rotated through the medium of the hand-wheel 79 and shafts 80 and 85, and when operated to place the eccentrics in the position shown at Fig. 6 it will also bring the collar 108 on shaft 85 in such a position that its flat or straight face 108ª is vertical, so that when the shaft 88 is partially rotated to throw in the clutch mechanism to start the twisters the arm 109, fixed on said shaft, will pass over this straight face and allow shaft 88 to complete its work. If the eccentrics are in any other position than shown at Fig. 6, the twister-arms will be more or less open and the collar 108 will have its straight face thrown out of the vertical, and consequently the arm will strike against such collar and thus prevent the throwing in of the clutch mechanism, as shown at Fig. 21. By means of this precautionary mechanism it is impossible to start up the twisting mechanism without first closing the twister-arms. 88$^a$, Figs. 4 and 14, is an arm secured to the rock-shaft 88, adapted to limit the throw of the handle-lever 94 by engaging with the adjusting-screw 88$^b$ on the carriage. The grip on the wires is effected through the medium of the dogs 76 in each of said twister-arms, as before mentioned. When, therefore, the said arms are in open position, the said dogs are freed from the clamping pressure of the screws 78, Fig. 9, thus permitting the free entrance of the legs of the bale-tie; but when the said arms are closed the end of the clamping-screw is brought firmly against the upper surface 76$^a$ of said dogs. The dogs when brought against the wires can of course go no farther in that direction; but it is desirable that there should be sufficient pressure on these dogs to prevent the wires slipping. This pressure is effected by means of the elongated holes 74 and the inclined face 76$^a$ of the said dogs. Now the length of the links 70 and 71, Fig. 6, are so regulated with respect to the movement of the rod 57 that after the twister-arms are brought together the said rod will still have a short distance to travel, as represented by the said elongated holes 74. This will also draw said links back, and the end of the clamping-screws, traveling up the said inclined faces of the dogs, will crowd such dogs hard against the wires and cause them to grip with such tenacity that it will be impossible for the wires to slip.

To operate the machine, the carriage is lowered on the supporting-columns until it is in the proper position with respect to the compressed bale of cotton, when the carriage is run forward, Fig. 5, and the jaws opened. The U-shaped bale-ties are then inserted from the opposite side of the bale, their projecting legs striking against the sides of the inclined mouth of the heads 110 and 111 of the twister-arms, whereby they are deflected into the central bore, Fig. 9, until the further progress of the ties are stopped by the curved portion $g$, Fig. 1, striking against the bale 112, between the press-platens 113 and 114. The jaws or twister-arms are then brought together, Fig. 6, by the rotation of the eccentric-shaft before mentioned, which will bring the free ends of the bale-tie central with respect to the cotton bale. When the arms are thus brought together and the ends of the wires firmly gripped, the carriage is moved backward, so as to take all the slack out of the said U-shaped bale-tie—in other words, this backward pull will straighten the curved portion $g$ of the U-shaped tie and bring such portion firm against the bale. This slack will then all be transferred to the opposite side of the bale, as shown at Fig. 7, which view represents the situation just as the twisting is about to begin. The clutch mechanism is then thrown in and the twister-arms are rotated until the twist is effected. The carriage is drawn forward under the influence of this twisting operation, so that the twisters will follow up as close to the bale as it is possible to twist, as shown at Fig. 8, when the arms are released, the carriage thrown back, and elevated to permit of another bale being inserted.

Having thus described my invention, what I claim as new, and desire to secure by Letters Patent, is—

1. The herein-described bale-tying machine adapted to be used in combination with a cotton-compressor, consisting of wire-twisting mechanism, hollow supporting-columns therefor, said mechanism having a sliding movement on said columns, counterbalance-weights within said columns and connected with said mechanism, for the purpose set forth.

2. In a machine, of the character described, the combination, substantially as shown of a horizontally-operating carriage carrying a series of wire-twisting devices, a support for said carriage, columns carrying racks, a shaft carrying pinions engaging said racks whereby a vertical movement is effected, a sleeve or hollow shaft embracing said first shaft and carrying pinions engaging racks on the said carriage for effecting a horizontal movement of the same, means substantially as shown for operating said shafts, for the purpose set forth.

3. In a machine of the character described, the combination, substantially as shown, of mechanism for twisting the ends of wire bale-ties, consisting of a carriage adapted to have a horizontal movement on its support, said carriage carrying rotatable spindles and their supports, twister-arms carrying gripper devices pivotally supported on said spindles, said arms adapted to be opened to receive bale-tie wires at the corners of a bale and close so as to bring the ends of said wires to the center of said bale, preparatory to effecting a twist in such ends, for the purpose set forth.

4. In a machine of the character described, the combination, of mechanism for twisting the ends of wire bale-ties, consisting of a horizontally-movable carriage and its vertically-movable support, said carriage carrying a series of rotatable hollow spindles and their supports, twister-arms pivotally connected to said spindles, operating-rods for said arms adapted to pass freely through said spindles, one end of said rods connected to a reciprocating bar or head, means for reciprocating said bar or head, links whereby the other ends of said rods are connected to said arms so that, the longitudinal movement of said rods will open or close said arms for the purpose described and set forth.

5. In a machine of the character described, the combination of the following instrumentalities, for bringing the projecting wires of bale-ties to the center of a compressed bale while such bale is under pressure and effecting a twist in said ends, viz: a horizontally-operating carriage and its support, a main driving-shaft, an eccentric-shaft carrying eccentrics, a reciprocating bar or head to which such eccentrics are attached, rotatable hollow spindles carrying each a pair of wire-twister arms pivoted thereto, operating-rods for each pair of said arms, said rods passing freely through said spindles and connected by one end to said reciprocating bar or head, the other end of said rods linked to said arms, spiral gears on each of said spindles combined with a worm-shaft engaging therewith, said eccentrics adapted to open said arms to receive the projecting ends of a wire bale-tie at the corner of a compressed bale and bring such ends to the center of the bale and take up the slack of said bale, means whereby said twister-arm-carrying spindles are rotated, means for automatically stopping said twisting mechanism, for the purpose set forth.

6. In a machine of the character described, the combination, with the rotatable twisting mechanism consisting of hollow spindles carrying operating-rods, twister-arms linked to said rods, a reciprocating bar or head to which the other ends of said rods are anchored, eccentric-shaft carrying eccentrics also anchored to said reciprocating bar or head, clutch mechanism, tripping mechanism, hand-wheel controlling mechanism for operating the eccentric-shaft, main driving-shaft, worm-shaft and spiral gears, all combined for the purpose set forth.

7. In a machine of the character described, the combination with twisting mechanism, twister-arms adapted to open and close, and mechanism for opening and closing said arms, of means substantially as shown whereby said arms are locked against rotation while open, for the purpose set forth.

8. The combination, in a machine of the character described, of a series of rotatable hollow spindles carrying twister-arms, pivotally connected therewith, said arms being hollow to receive the projecting ends of a wire bale-tie, said arms bell-mouthed to more readily receive such ends, clamping-dogs pivotally supported on such arms, operating-rods running through said hollow spindles, links connecting said arms with said rods, means on said links to engage said dogs when said arms are closed and thus cause the ends of said wires to be firmly held, for the purpose set forth.

9. The combination, in a machine of the character described, comprising a series of hollow twister-arms, a rotatable support to which said arms are pivoted, the free ends of said arms bell-mouthed and adapted thereby to more readily receive the free ends of wire bale-ties, for the purpose set forth.

10. In a machine of the character described, the combination with hollow twisting-arms having an axial bore adapted to receive the projecting ends of wire bale-ties, of gripping-dogs pivotally hung on said arms, a gripping-face on said dogs adapted to firmly engage and grip the side of the wire when said arms are closed and means for bringing about such engagement, for the purpose set forth.

11. The combination, in a machine of the character described, consisting of a pair of twisting-arms pivotally hung on a rotatable support, an operating-rod located between said arms, links connecting said arms thereto, so that the endwise movement of said rod will open and close said arms, for the purpose set forth.

12. The combination, in a machine of the character described, consisting of a pair of hollow twisting-arms adapted to open and close, a rotatable support on which said arms are hung, an operating-rod between said arms, links connecting said rod and arms so that the endwise movement of said rod will open and close said arms, a gripping-dog pivotally hung on each of said arms, means on said links for engaging said dogs and thereby cause them to firmly grip the ends of a wire bale-tie when said arms are closed and be released therefrom when said arms are open, for the purpose set forth.

13. The combination, in a machine of the character described, of a pair of hollow twister-arms, a rotatable support to which said arms are pivoted, an endwise-movable rod between said arms, links connecting said rod and arms, gripping-dogs pivotally hung on said arms over the feeding-line of the free ends of a wire bale-tie, said dogs having an outer inclined surface to be engaged by means provided on said links when said arms are closed, means, substantially as shown, whereby the pivotal points of connection between said links and arms are shifted when said arms are closed so that the gripping engagement of said links will be increased, for the purpose set forth.

14. The combination, in a machine of the character described, of a pair of pivotally-hung twister-arms whose free ends are adapted to receive the ends of a bale-tie, each arm provided with a gripping-dog pivotally supported thereon, said dogs having an outer inclined face, an operating-rod located between said arms, links interposed between said rod and arms and pivotally connected to each, means on said links for engaging the inclined faces of said dogs, the pivotal connection between the links and said arms being so arranged that when the endwise movement of said rod has brought the arms together, the arms are free to be moved back still further by said rod and tighten the grip of the dogs on the wire, for the purpose set forth.

15. The combination with a compressor adapted to compress bales of cotton or other like material, consisting of a series of pairs of twister-arms, each pair pivotally connected by one end to a rotative spindle, the other end free and bell-mouthed to more readily gather the ends of a wire bale-tie, each arm provided with a central bore to receive the ends of the wire, the pivotal point of said arms being central with the bale and within the limit of compression of such bale so that, when the arms are opened they will form an acute angle with the free ends of said arms in close proximity with the corners of the bale, for the purpose set forth.

16. The herein-described twister-arms having a central bore running through the body thereof to admit the free ends of a wire bale-tie, one end of said arms pivoted to a rotatable spindle, the other end free and bell-mouthed so as to more readily gather the free ends of a bale-tie, for the purpose set forth.

Signed at Bridgeport, in the county of Fairfield and State of Connecticut, this 8th day of June, A. D. 1900.

JOHN H. KENNEDY.

Witnesses:
L. R. HOYT,
S. G. MEEKER.